United States Patent
Lu

(10) Patent No.: US 9,531,915 B2
(45) Date of Patent: Dec. 27, 2016

(54) IMAGE ENCODING SYSTEM AND METHOD THEREOF

(71) Applicant: ASPEED Technology Inc., Hsinchu (TW)

(72) Inventor: Chung-Yen Lu, Hsinchu (TW)

(73) Assignee: ASPEED TECHNOLOGY INC., Hsinchu (TW)

(*) Notice: Subject to any disclaimer, the term of this patent is extended or adjusted under 35 U.S.C. 154(b) by 541 days.

(21) Appl. No.: 14/096,488

(22) Filed: Dec. 4, 2013

(65) Prior Publication Data
US 2015/0156517 A1   Jun. 4, 2015

(51) Int. Cl.
| | | |
|---|---|---|
| H04N 19/63 | (2014.01) | |
| H04N 1/413 | (2006.01) | |
| H04N 19/60 | (2014.01) | |
| H04N 19/64 | (2014.01) | |
| H04N 19/126 | (2014.01) | |
| H04N 19/152 | (2014.01) | |
| H04N 19/169 | (2014.01) | |
| H04N 19/635 | (2014.01) | |
| H04N 19/423 | (2014.01) | |
| H04N 19/186 | (2014.01) | |

(52) U.S. Cl.
CPC ............ *H04N 1/413* (2013.01); *H04N 19/126* (2014.11); *H04N 19/152* (2014.11); *H04N 19/1883* (2014.11); *H04N 19/423* (2014.11); *H04N 19/60* (2014.11); *H04N 19/63* (2014.11); *H04N 19/635* (2014.11); *H04N 19/64* (2014.11); *H04N 19/186* (2014.11)

(58) Field of Classification Search
CPC ...... H04N 1/3217; H04N 19/63; H04N 19/60; H04N 19/635; H04N 19/64
See application file for complete search history.

(56) References Cited

U.S. PATENT DOCUMENTS

| | | | | |
|---|---|---|---|---|
| 5,966,465 A | * | 10/1999 | Keith | G06F 17/148 375/E7.016 |
| 6,195,465 B1 | * | 2/2001 | Zandi | G06F 17/148 375/E7.016 |
| 6,215,907 B1 | | 4/2001 | Kumar et al. | |
| 6,510,251 B1 | | 1/2003 | Shirouzu et al. | |
| 6,553,071 B1 | * | 4/2003 | Kim | H04N 19/619 348/398.1 |

(Continued)

*Primary Examiner* — Robert Hance
(74) *Attorney, Agent, or Firm* — Muncy, Geissler, Olds & Lowe, P.C.

(57) ABSTRACT

An image encoding system is disclosed. The image encoding system comprises a wavelet transform unit and a processing circuit. The wavelet transform unit performs a multiple-line-based wavelet transform on plural consecutive component lines to generate a wavelet transformed image comprising wavelet coefficients of plural sub-bands. The processing circuit coupled to the wavelet transform unit for quantizing, scanning and encoding the wavelet coefficients to generate a compressed image. Here, a number of the plural consecutive component lines is a multiple of 2 and less than 5. Since the wavelet transform unit performs the multiple-line-based wavelet transform to reduce the storage amount and maintain a good compression quality, an image encoding system of the invention can use SRAM buffers instead of a DRAM buffer.

17 Claims, 18 Drawing Sheets

(56) References Cited

U.S. PATENT DOCUMENTS

| | | | |
|---|---|---|---|
| 6,591,017 B1 * | 7/2003 | Fukuhara | H04N 19/122 |
| | | | 375/240.19 |
| 6,678,419 B1 | 1/2004 | Malvar | |
| 6,782,051 B2 | 8/2004 | Pesquet-Popescu | |
| 7,120,307 B2 | 10/2006 | Malvar | |
| 8,184,714 B2 | 5/2012 | Shon et al. | |
| 8,203,619 B2 | 6/2012 | Cho et al. | |
| 2003/0099466 A1 * | 5/2003 | Hurley | H04N 5/9264 |
| | | | 386/328 |
| 2005/0074178 A1 * | 4/2005 | Montrone | H04N 19/63 |
| | | | 382/240 |
| 2007/0081589 A1 * | 4/2007 | Kim | H04N 19/159 |
| | | | 375/240.03 |
| 2008/0101464 A1 * | 5/2008 | Lei | H04N 19/647 |
| | | | 375/240.03 |

* cited by examiner based on single-line encoding kernel
capable of processing 720 components

| sequence | source |
|---|---|
| 0 | Y component line [0] |
| 1 | U component line [0] |
| 2 | V component line [0] |
| 3 | Y component line [1] |
| 4 | U component line [1] |
| 5 | V component line [1] |
| ⋮ | ⋮ |
| 1437 | Y component line [479] |
| 1438 | U component line [479] |
| 1439 | V component line [479] |

FIG. 5A based on dual-line encoding kernel
capable of processing 720 components

| sequence | source |
|---|---|
| 0 | Y component line [0]<br>Y component line [1] |
| 1 | U component line [0]<br>U component line [1] |
| 2 | V component line [0]<br>V component line [1] |
| 3 | Y component line [2]<br>Y component line [3] |
| 4 | U component line [2]<br>U component line [3] |
| 5 | V component line [2]<br>V component line [3] |
| ⋮ | ⋮ |
| 717 | Y component line [478]<br>Y component line [479] |
| 718 | U component line [478]<br>U component line [479] |
| 719 | V component line [478]<br>V component line [479] |

FIG. 6A based on four-line encoding kernel capable of processing 720 components

| sequence | source |
|---|---|
| 0 | Y component line [0]<br>Y component line [1]<br>Y component line [2]<br>Y component line [3] |
| 1 | U component line [0]<br>U component line [1]<br>U component line [2]<br>U component line [3] |
| 2 | V component line [0]<br>V component line [1]<br>V component line [2]<br>V component line [3] |
| ⋮ | ⋮ |
| 357 | Y component line [476]<br>Y component line [477]<br>Y component line [478]<br>Y component line [479] |
| 358 | U component line [476]<br>U component line [477]<br>U component line [478]<br>U component line [479] |
| 359 | V component line [476]<br>V component line [477]<br>V component line [478]<br>V component line [479] |

FIG. 7A

| L3 | H3 | H2 | H1U | H1D |
|---|---|---|---|---|
| 360 pt | 360 pt | 720 pt | 720 pt | 720 pt |
| Q[0] | Q[1] | Q[2] | Q[3] | Q[4] |

2880 wavelet coefficients corresponding quantization value

FIG. 7C based on hybrid encoding kernel
capable of processing 720 components

| sequence | source |
|---|---|
| 0 | Y component line [0]<br>Y component line [1] |
| 1 | U component line [0] |
| 2 | V component line [0] |
| 3 | Y component line [2]<br>Y component line [3] |
| 4 | U component line [2] |
| 5 | V component line [2] |
| ⋮ | ⋮ |
| 717 | Y component line [478]<br>Y component line [479] |
| 718 | U component line [478] |
| 719 | V component line [478] |

FIG. 8A based on single-line encoding kernel
capable of processing 360 components

| sequence | source |
|---|---|
| 0 | first half of Y component line [0] |
| 1 | first half of U component line [0] |
| 2 | first half of V component line [0] |
| 3 | second half of Y component line [0] |
| 4 | second half of U component line [0] |
| 5 | second half of V component line [0] |
| ⋮ | ⋮ |
| 2877 | second half of Y component line [479] |
| 2878 | second half of U component line [479] |
| 2879 | second half of V component line [479] |

FIG. 11A based on dual-line encoding kernel capable of processing 360 components

| sequence | source |
|---|---|
| 0 | first half of Y component line [0]<br>first half of Y component line [1] |
| 1 | first half of U component line [0]<br>first half of U component line [1] |
| 2 | first half of V component line [0]<br>first half of V component line [1] |
| 3 | second half of Y component line [0]<br>second half of Y component line [1] |
| 4 | second half of U component line [0]<br>second half of U component line [1] |
| 5 | second half of V component line [0]<br>second half of V component line [1] |
| ⋮ | ⋮ |
| 1437 | second half of Y component line [478]<br>second half of Y component line [479] |
| 1438 | second half of U component line [478]<br>second half of U component line [479] |
| 1439 | second half of V component line [478]<br>second half of V component line [479] |

FIG. 11B based on hybrid encoding kernel capable of processing 360 components

| sequence | source |
|---|---|
| 0 | first half of Y component line [0]<br>first half of Y component line [1] |
| 1 | first half of U component line [0] |
| 2 | first half of V component line [0] |
| 3 | second half of Y component line [0]<br>second half of Y component line [1] |
| 4 | second half of U component line [0] |
| 5 | second half of V component line [0] |
| ⋮ | ⋮ |
| 1437 | second half of Y component line [478]<br>second half of Y component line [479] |
| 1438 | second half of U component line [478] |
| 1439 | second half of V component line [478] |

FIG. 11C

IMAGE ENCODING SYSTEM AND METHOD THEREOF

BACKGROUND OF THE INVENTION

Field of the Invention

The invention relates to image processing, and more particularly, to an image encoder system suitable for real-time image transmission.

Description of the Related Art

A discrete wavelet transform (DWT) is now extremely well-known and described in numerous image coding standards, such as JPEG2000, Dirac, and Microsoft's RemoteFX. One-dimensional (1D) DWT consists of the iterated application of a complementary pair of half-band filters 11 and 12 followed by subsampling by a factor 2, as illustrated in FIG. 1.

Regarding two-dimensional images, wavelet filters are normally applied in both vertical and horizontal directions to each image component to produce four sub-bands: LL(left-top), LH(left-bottom), HL(right-top) and HH(right-bottom). In the case of 2D DWT, only the LL sub-band is iteratively decomposed to obtain the decomposition of the two-dimensional spectrum as shown in FIG. 2.

FIG. 3 is a block diagram showing an exemplary wavelet image encoding system disclosed in U.S. Pat. No. 6,678,419. Referring to FIG. 3, image pixel data is provided to a wavelet transform block 31, which operates in a known manner to provide wavelet coefficients to a quantization block 32. Afterwards, the wavelet coefficients are scalar-quantized by a quantization block 32 to reduce the number of bits to represent them, at the expense of quality. The output of the quantization block 32 is a set of integer numbers which have to be encoded bit-by-bit. The parameter that can be changed to set the final quality is the quantization step; the greater the step, the greater the compression and the image quality become.

A reordering and blocking block 33 groups the output of the quantization block 32 into clusters of like values. It results in a clustering or grouping together of macroblocks of frequency coefficients which are most likely to be zero. The reordering increases the likelihood of groupings of similar data, in the sense that the data tends to have a monotonically decaying distribution of amplitudes. A lossless adaptive encoding block 34 receives the macroblocks and encodes them in a lossless manner. The clustering of the macroblocks provides data to compress which has large clusters of zeros. Further, reordering the data by encoding on a bit plane basis increases the likelihood of finding large strings of zeros. Starting with the most significant bit for the first bit plane leads to a higher likelihood of a long string of zeros. Further, this also ensures that the most relevant data is encoded first. By the time the third or fourth bit planes are encoded, the odds are about equal for a zero as opposed to a one, and straight binary encoding may be effectively used.

Most of all well known wavelet image coding systems use 2D wavelet transform to gain encoding efficiency, in other words, high compression ratio with a fixed quality. Some wavelet image coding systems use tile-based coding, that is, dividing an image into non-overlapped tiles. The tile size is typically 64×64 or larger. Hence, such coding systems typically require a DRAM subsystem to store source image pixels, intermediate processing data and a coded bit-stream.

However, some real-time image transmission systems expect a DRAM-less solution to reduce cost and system complexity. For example, a real-time image transmission system is applied in surveillance camera, which has a constant transmission rate and requests no DRAM if possible. Such DRAM-buffer-less real-time image transmission system could not afford 2D wavelet image encoding algorithm. Accordingly, there is a need for a real-time image encoding system having a good compression quality and operating without using a DRAM buffer.

SUMMARY OF THE INVENTION

In view of the above-mentioned problems, an object of the invention is to provide an image encoding system having a good compression quality and operating without a DRAM buffer.

One embodiment of the invention provides an image encoding system. The image encoding system comprises a wavelet transform unit, a scan unit, a quantizer, an entropy coder and an output buffer. The wavelet transform unit performs 1D wavelet transform on an input component segment to generate wavelet coefficients of plural sub-bands. The scan unit and the quantizer are coupled between the wavelet transform unit and the entropy coder. The scan unit reads the plural sub-bands in reverse order. The quantizer performs quantization on the plural sub-bands according to quantization values of the plural sub-bands, which are derived from an index signal. The entropy coder encodes and generates a compressed image. The output buffer stores the compressed image and generates the index signal. Here, the index signal indicates a buffer fullness relative to a capacity of the output buffer and the quantization values of the plural sub-bands are related to the plural sub-bands and the buffer fullness.

Another embodiment of the invention provides an image encoding system. The image encoding system comprises a wavelet transform unit and a processing circuit. The wavelet transform unit performs a multiple-line-based wavelet transform on plural consecutive component segments to generate a wavelet transformed image comprising wavelet coefficients of plural sub-bands. The processing circuit coupled to the wavelet transform unit for quantizing, scanning and encoding the wavelet coefficients to generate a compressed image. Here, a number of the plural consecutive component lines is a multiple of 2 and less than 5.

Another embodiment of the invention provides an image encoding system. The image encoding system comprises a wavelet transform unit and a processing circuit. The wavelet transform unit performs a dual-line-based wavelet transform on two consecutive luminance component segments and a 1D wavelet transform on every other chrominance component segment to generate a wavelet transformed image comprising wavelet coefficient of plural sub-bands. The processing circuit coupled to the wavelet transform unit for quantizing, scanning and encoding the wavelet coefficients to generate a compressed image.

Another embodiment of the invention provides an image encoding method. The image encoding method, applied in an image encoding system, comprises the steps of: performing a multiple-line-based wavelet transform on plural consecutive component segments to obtain a wavelet transformed image comprising wavelet coefficients of plural sub-bands; and, quantizing, scanning and encoding the wavelet coefficients to obtain a compressed image; wherein a number of the plural consecutive component segments is a multiple of 2 and less than 5.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 5A shows an exemplary sequence of encoding a 720×480 color image based on a single-line coding kernel capable of processing 720 components.

FIG. 6A shows an exemplary sequence of encoding a 720×480 color image based on a dual-line coding kernel capable of processing 720 components.

FIG. 7A shows an exemplary sequence of encoding a 720×480 color image based on a four-line coding kernel capable of processing 720 components.

FIG. 7C shows an exemplary wavelet transformed image generated by the wavelet transform unit 42b of FIG. 7B.

FIG. 8A shows an exemplary sequence of encoding a 720×480 color image based on the hybrid coding kernel capable of processing 720 components.

FIG. 11A shows an exemplary sequence of encoding a 720×480 color image based on the single-line coding kernel capable of processing 360 components.

FIG. 11B shows an exemplary sequence of encoding a 720×480 color image based on the dual-line coding kernel capable of processing 360 components.

FIG. 11C shows an exemplary sequence of encoding a 720×480 color image based on the hybrid coding kernel capable of processing 360 components.

DETAILED DESCRIPTION OF THE INVENTION

Figure 1:
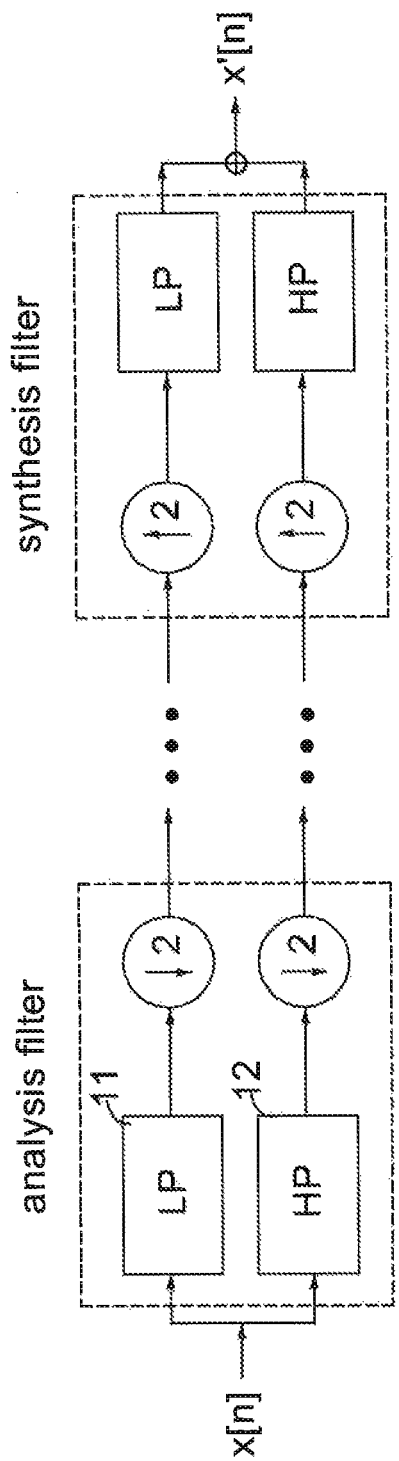
FIG. 1 is a schematic diagram of an analysis and synthesis filter pairs.
Figure 2:
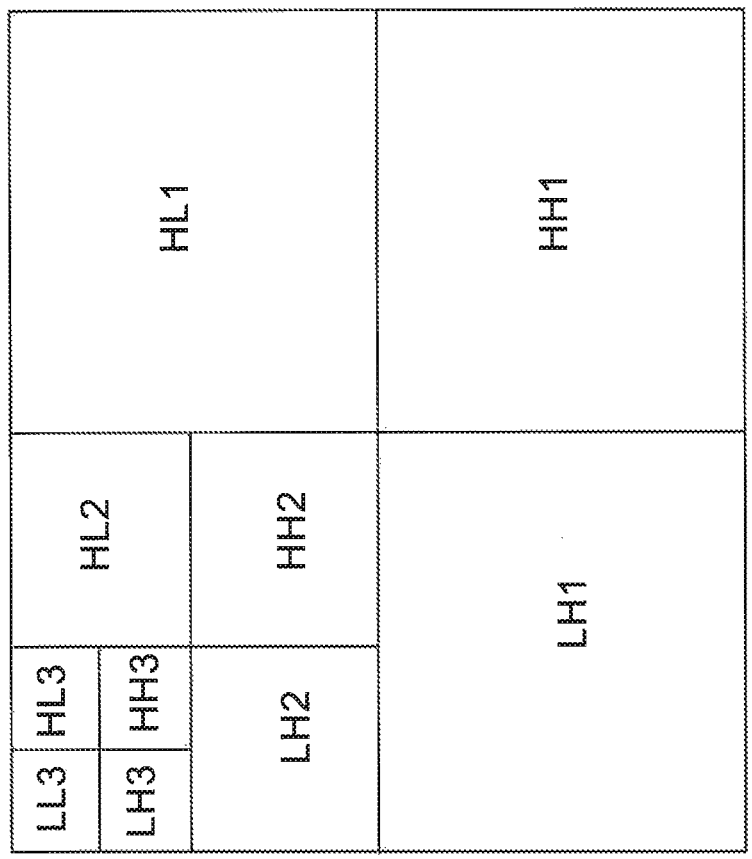
FIG. 2 is a diagram showing a three-level wavelet transform frequency decomposition.
Figure 3:
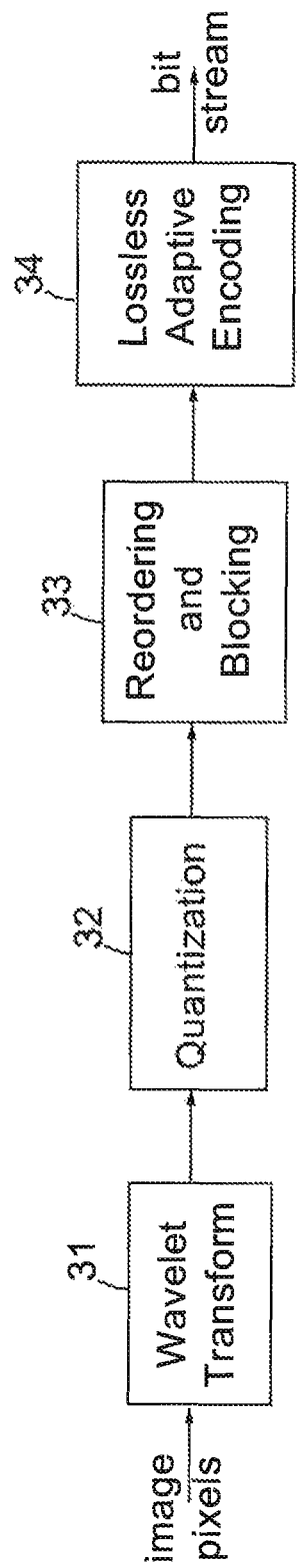
FIG. 3 is a block diagram showing an exemplary wavelet image encoding system disclosed in U.S. Pat. No. 6,678,419.

As used herein and in the claims, the term "a," "an," "the" and similar terms used in the context of the present invention (especially in the context of the claims) are to be construed to cover both the singular and plural unless otherwise indicated herein or clearly contradicted by the context. Besides, the term "dual-line-based wavelet transform" refers to a first modified wavelet transform (including an addition operation, a subtraction operation and 1D wavelet transform) simultaneously performed on two consecutive component lines, such as two consecutive Y-component lines in YUV color space; the term "four-line-based wavelet transform" refers to a second modified wavelet transform (including addition operations, subtraction operations and 1D wavelet transform) simultaneously performed on four consecutive component lines, such as four consecutive Y-component lines in YUV color space; the term "hybrid wavelet transform" refers to a combination of the dual-line based wavelet transform and 1D wavelet transform performed on two consecutive luminance lines (such as two Y-component lines in YUV color space) and every other chrominance line (such as a U-component line and a V-component line in YUV color space), respectively.

A feature of the invention is to perform a line-based wavelet transform (one of a 1D wavelet transform, a dual-line-based wavelet transform, a four-line-based wavelet transform and a hybrid wavelet transform) for real-time image transmission to reduce the storage amount and maintain a good compression quality. Accordingly, an image encoding system of the invention can use line buffers (implemented with SRAM) instead of a DRAM buffer to store a small amount of source image data, intermediate processing results and coded bits, thereby to have a good compression quality and a substantially constant transmission rate. Another feature of the invention is to perform adaptive quantization for real-time image transmission in order to do buffer (output buffer 46) fullness control.

The purpose of a wavelet transform is to represent the original image by a different basis to achieve the objective of decorrelation. According to this invention, the wavelet transform unit 42 is configured in one of four configurations (i.e., single-line configuration, dual-line configuration, four-line configuration and hybrid configuration) to perform one of four wavelet transforms on the input image. The four wavelet transforms are 1D wavelet transform, dual-line-based wavelet transform, four-line-based wavelet transform and hybrid wavelet transform. Correspondingly, the image encoding system (40, 40A) of the invention utilizes one of a single-line coding kernel, a dual-line coding kernel, a four-line coding kernel and a hybrid coding kernel (a combination of the single-line coding kernel and the dual-line coding kernel) to reduce the storage capacity and maintain a good compression quality. It is noted that the image encoding system (40, 40A) of the invention can be applied to gray level images and color images. For purposes of clarity and ease of description, in the following embodiments, the image encoding systems (40, 40A) encoding a color image of 720×480 resolution are described in conjunction with YUV color space only. However, the YUV color space and the size of the color image are provided by example and not limitations of the invention. In the actual implementations, any color space and any image size can be used and these also fall in the scope of the invention. Besides, common reference numerals are used throughout the drawings and the detailed description to indicate the same elements.

Figure 4:
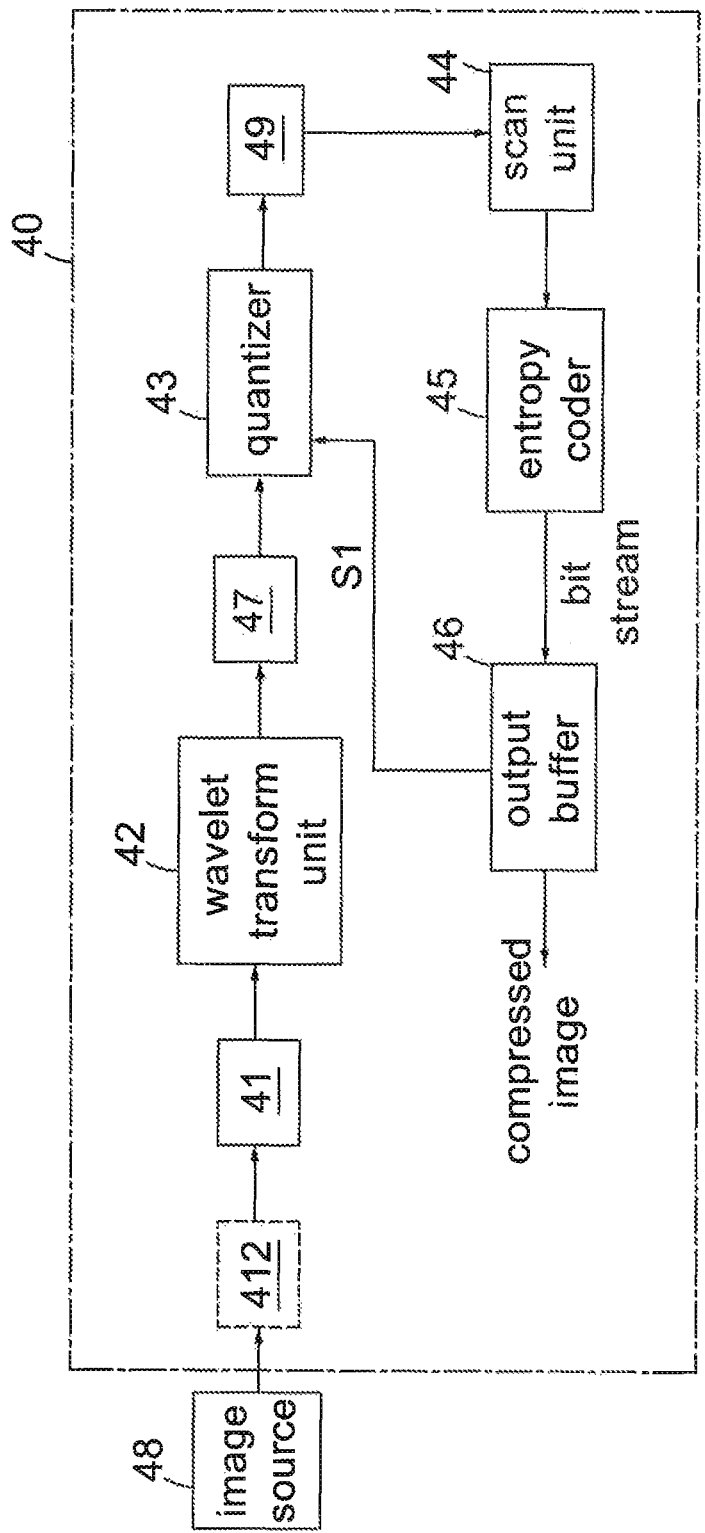
FIG. 4 is a block diagram showing an image encoding system according to one embodiment of this invention.

FIG. 4 is a block diagram showing an image encoding system according to one embodiment of this invention. Referring to FIG. 4, an image encoding system 40 includes a dividing unit 412, three SRAM (static random-access memory) buffers 41, 47 and 49, a wavelet transform unit 42, a quantizer 43, a scan unit 44, an entropy coder 45 and an output buffer 46. Here, the output buffer 46 is also implemented with SRAM and the capacities of the buffers 41, 46, 47 and 49 are far less than those used in the conventional image encoding system that performs 2D wavelet transform. Please be noted that the dividing unit 412 is optional and therefore represented in dashed lines. For ease of clarity and ease of description, the image encoding system 40 temporarily excluding the dividing unit 412 will be detailed herein and the operations of the dividing unit 412 will be described in the last part of the specification.

Figure 5B:
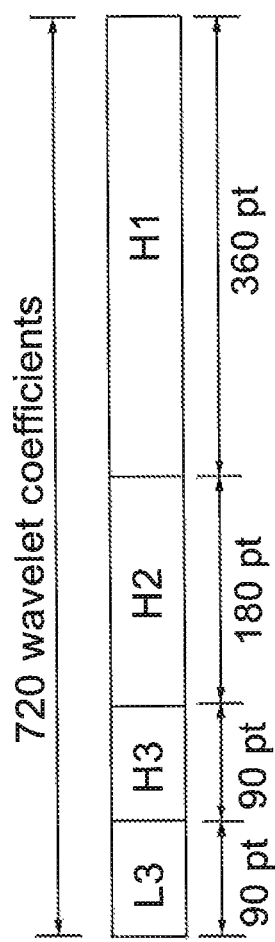
FIG. 5B shows an exemplary 1D wavelet transformed image for three-level (n=3) decomposition of a 720-pixel component line.

When configured in a single-line configuration to operate in an image encoding system 40 with the single-line coding kernel, the wavelet transform unit 42 performs a 1D wavelet transform on each component line. At first, several component lines, at least including two Y-component lines, two U-component lines and two V-component lines, are inputted from the image source 48 and stored in SRAM buffer 41. FIG. 5A shows an exemplary sequence of encoding a 720×480 color image based on the single-line coding kernel. It is clearly illustrated in FIG. 5A that the image encoding system 40 with the single-line coding kernel encodes image pixels on a line-by-line basis. The wavelet transform unit 42 in a single-line configuration receives the component lines in sequence and performs n-level 1D wavelet transform on each component line to finally generate wavelet coefficients of (n+1) frequency sub-bands. Then, the wavelet transform unit 42 stores the wavelet coefficients of (n+1) frequency sub-bands in SRAM buffer 47. Because most of the image data energy flocks to the low frequency band, the decomposition of the low frequency coefficients can be iteratively repeated n times to obtain n-level decomposition in the wavelet transform unit 42, where n denotes the number of levels of decomposition. For example, when n=3, the wavelet transform unit 42 in a single-line configuration performs three-level 1D wavelet decomposition of each component line to generate the wavelet transformed image having four frequency sub-bands as shown in FIG. 5B. FIG. 5B shows an exemplary 1D wavelet transformed image for three-level (n=3) decomposition of a 720-pixel component line. Referring to the 1D wavelet transformed image of FIG. 5B, a leftmost sub-band L3 includes wavelet coefficients of the lowest frequency sub-band and a rightmost sub-band H1 includes wavelet coefficients of the highest frequency sub-band.

Figure 6B:
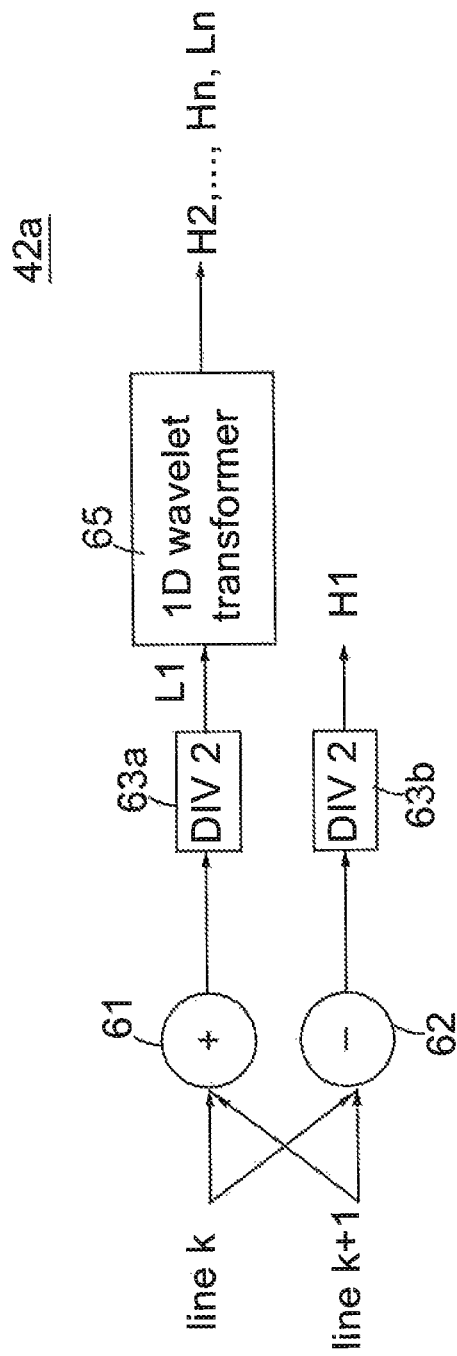
FIG. 6B is a schematic diagram of a wavelet transform unit 42a that performs an n-level dual-line-based wavelet transform according to an embodiment of the invention.

When configured in a dual-line configuration to operate in an image encoding system 40 with the dual-line coding kernel, the wavelet transform unit 42 performs the dual-line based wavelet transform (or decomposition) on two consecutive component lines. FIG. 6A shows an exemplary sequence of encoding a 720×480 color image based on the dual-line coding kernel. Referring to FIG. 6A, the image encoding system 40 with the dual-line coding kernel encodes image pixels on a dual-line-by-dual-line basis. The wavelet transform unit 42 in a dual-line configuration simultaneously receives two consecutive component lines and then performs n-level dual-line-based wavelet transform on the two consecutive component lines to finally generate wavelet coefficients of (n+1) frequency sub-bands. FIG. 6B is a schematic diagram of the wavelet transform unit 42a that performs an n-level dual-line-based wavelet transform according to an embodiment of the invention. Referring to FIG. 6B, the wavelet transform unit 42a in a dual-line configuration includes an adder 61, a subtractor 62, two dividers 63a, 63b and 1D wavelet transformer 65. It is noted that two consecutive component lines k & (k+1) are inputted in parallel to the adder 61 and the subtractor 62, where k>=0. The operations of the adder 61 and the divider 63a are analogous to low-pass filtering operations applied in the vertical direction of the two consecutive component lines while the operations of the subtractor 62 and the divider 63b are analogous to high-pass filtering operations applied in the vertical direction of the two consecutive component lines. Thus, the divider 63a generates a transformed image L1 composed of low-pass wavelet coefficients while the divider 63b generates a transformed image H1 composed of high-pass wavelet coefficients. After that, the 1D wavelet transformer 65 performs (n−1)-level 1D wavelet transform on the low-pass image L1 to generate n sub-band images, i.e., H2 H3, . . . , Hn and Ln sub-band images. Therefore, after the n-level dual-line-based wavelet transform is complete, the wavelet transform unit 42a generates a wavelet transformed image including wavelet coefficients of (n+1) frequency sub-bands. Here, the (n+1) frequency sub-bands includes H1, H2, . . . , Hn and Ln sub-bands. The number of the wavelet coefficients in the wavelet transformed image is equal to the number of components in both of the two consecutive component lines k & (k+1).

Figure 6C:
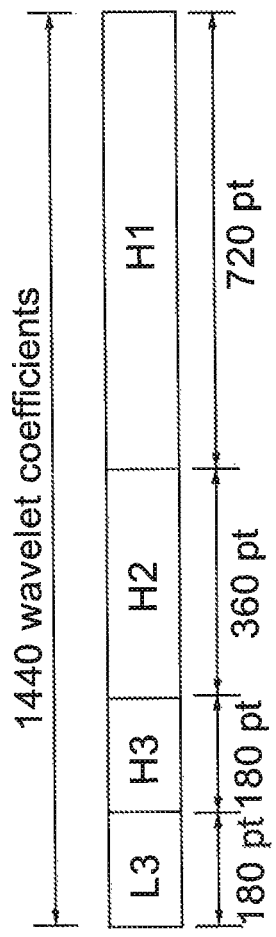
FIG. 6C shows an exemplary wavelet transformed image generated by the wavelet transform unit 42a of FIG. 6B.

Assuming that the wavelet transform unit 42a performs three-level dual-line-based wavelet transform on two consecutive 720-pixel component lines k & (k+1) of a 720×480 color image; besides, the component line k has the following components: $A_0, A_1, A_2, \ldots A_{719}$; the component line (k+1) has the following components: $B_0, B_1, B_2, \ldots B_{719}$. In this regard, the H1 sub-band image includes the following wavelet coefficients: $(A_0-B_0)/2, (A_1-B_1)/2, (A_2-B_2)/2, \ldots, (A_{719}-B_{719})/2$; the L1 sub-band image includes the following wavelet coefficients: $(A_0+B_0)/2, (A_1+B_1)/2, (A_2+B_2)/2, \ldots, (A_{719}+B_{719})/2$. Finally, as shown in FIG. 6C, the wavelet transform unit 42a generates four sub-band images H1, H2, H3 and L3 composed of 1440 wavelet coefficients. Here, the H1 sub-band image includes 720 wavelet coefficients; the H2 sub-band image includes 360 wavelet coefficients; each of the H3 and the L3 sub-band images includes 180 wavelet coefficients.

Figure 7B:
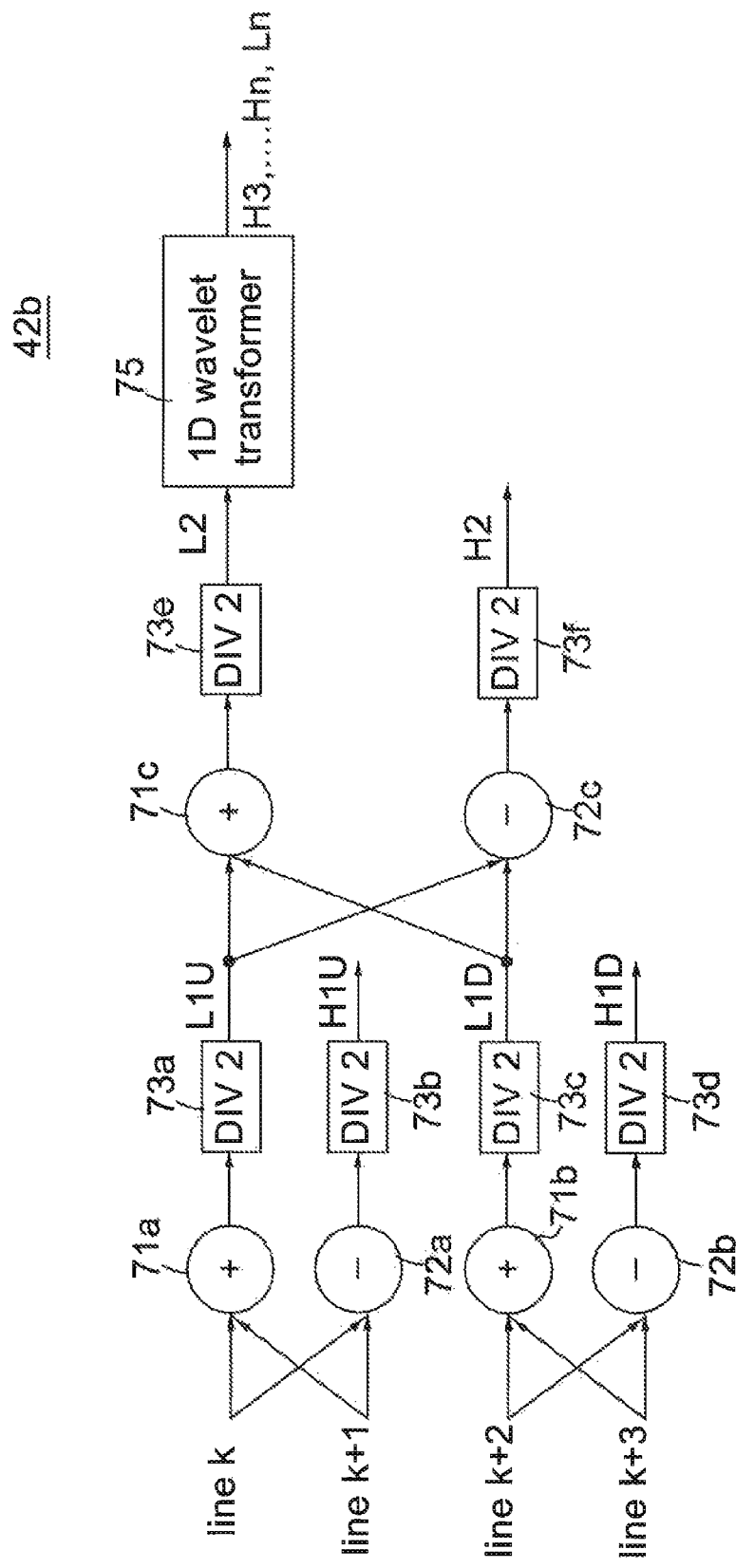
FIG. 7B is a schematic diagram of the wavelet transform unit 42b that performs an n-level four-line-based wavelet transform according to another embodiment of the invention.

While configured in a four-line configuration to operate in an image encoding system 40 with a four-line coding kernel, the wavelet transform unit 42 performs the four-line based wavelet transform (or decomposition) on four consecutive component lines. FIG. 7A shows an exemplary sequence of encoding a 720×480 color image based on the four-line coding kernel. Referring to FIG. 7A, the image encoding system 40 with the four-line coding kernel encodes image pixels on a four-line-by-four-line basis. The wavelet transform unit 42 in a four-line configuration simultaneously receives four consecutive component lines, performs n-level four-line-based wavelet transform on the four consecutive component lines to finally generate wavelet coefficients of (n+2) frequency sub-bands. FIG. 7B is a schematic diagram of the wavelet transform unit 42b that perform an n-level four-line-based wavelet transform according to an embodiment of the invention. Referring to FIG. 7B, the wavelet transform unit 42b in a four-line configuration includes three adders 71a, 71b, 71c, three subtractors 72a, 72b, 72c, six dividers 73a-73f and 1D wavelet transformer 75. It is noted that four consecutive component lines k~(k+3) are inputted in parallel to two adders 71a, 71b and two subtractors 72a, 72b, where k>=0. Similar to the embodiment of FIG. 6B, the operations of the adder (71a, 71b, 71c) in conjunction with the divider (73a, 73c, 73e) are analogous to low-pass filtering operations applied in the vertical direction of the two consecutive component lines/two low-pass images while the operations of the subtractor (72a, 72b, 72c) in conjunction with and the divider (73b, 73d, 73f) are analogous to high-pass filtering operations applied in the vertical direction of the two input component lines/two low-pass images. Thus, the dividers 73a and 73c respectively generate two low-pass images L1U and L1D while the dividers 73b and 73d generate two high-pass images H1U and H1D. Next, two low-pass images L1U and L1D are inputted in parallel to the adder 71c and the subtractor 72c. Then, the divider 73e generates a transformed image L2 while the divider 73f generates a transformed image H2.

After that, the 1D wavelet transformer 75 performs (n−2)-level 1D wavelet transform on the low-pass image L2 to generate wavelet coefficients of (n−1) sub-band images, where n After the n-level four-line-based wavelet transform is complete, the wavelet transform unit 42b generates wavelet coefficients of (n+2) sub-band images, including H1D, H1U, H2, . . . , Hn and Ln sub-band images. Here, the (n+2) sub-bands includes H1D, H1U, H2, . . . , Hn and Ln sub-bands. The number of the wavelet coefficients in the wavelet transformed image is equal to the number of components in all of the four consecutive component lines k (k+3).

Assuming that the wavelet transform unit 42b in the four-line configuration receives four consecutive component lines k~(k+3) and performs three-level four-line-based wavelet transform on four consecutive 720-pixel component lines of a 720×480 color image; besides, the component line k has the following components: $A_0, A_1, A_2, \ldots A_{719}$; the component line (k+1) has the following components: $B_0, B_1, B_2, \ldots B_{719}$; the component line (k+2) has the following components: $C_0, C_1, C_2, \ldots C_{719}$; the component line (k+3) has the following components: $D_0, D_1, D_2, \ldots D_{719}$. In this regard, the H1U sub-band image includes the following wavelet coefficients: $(A_0-B_0)/2, (A_1-B_1)/2, (A_2-B_2)/2, \ldots, (A_{719}-B_{719})/2$; the H1D sub-band image includes the following wavelet coefficients: $(C_0-D_0)/2, (C_1-D_1)/2, (C_2-D_2)/2, \ldots, (C_{479}-D_{479})/2$; the L1U sub-band image includes the following wavelet coefficients: $(A_0+B_0)/2, (A_1+B_1)/2, (A_2+B_2)/2, \ldots, (A_{719}+B_{719})/2$; the L1D sub-band image includes the following wavelet coefficients: $(C_0+D_0)/2, (C_1+D_1)/2, (C_2+D_2)/2, \ldots, (C_{719}+D_{719})/2$; the H2 sub-band image includes the following wavelet coefficients: $(A_0+B_0-C_0-D_0)/4, (A_1+B_1-C_1-D_1)/4, (A_2+B_2-C_2-D_2)/4, \ldots, (A_{719}+B_{719}-C_{719}-D_{719})/4$; the L2 sub-band image includes the following wavelet coefficients: $(A_0+B_0+C_0+D_0)/4, (A_1+B_1+C_1+D_1)/4, (A_2+B_2+C_2+D_2)/2, \ldots, (A_{719}+B_{719}+C_{719}+D_{719})/2$. As shown in FIG. 7C, the wavelet transform unit 42b finally generates five sub-band images H1D, H1U, H2, H3 and L3 composed of 2880 wavelet coefficients. Here, each of the H1D, H1U and H2 sub-band images includes 720 wavelet coefficients; each of the H3 and the L3 sub-band images includes 360 wavelet coefficients. Please be noted that the positions of H1D and H1U in the transformed image of FIG. 7C are interchangeable.

When configured in a hybrid configuration to operate in an image encoding system 40 with a hybrid coding kernel (a combination of the single-line coding kernel and the dual-line coding kernel), the wavelet transform unit 42 performs the hybrid wavelet transform on two consecutive luminance lines and every other chrominance line. That is, the wavelet transform unit 42 in a hybrid configuration performs the dual-line-based wavelet transform on two consecutive Y-component lines and performs the 1D wavelet transform on every other U-component line and every other V-component line. FIG. 8A shows an exemplary sequence of encoding a 720×480 color image based on the hybrid coding kernel. In the embodiment of FIG. 8A, the image encoding system 40 with the hybrid coding kernel encodes Y components on a dual-line-by-dual-line basis, encodes each of even-numbered U-component and V-component lines and discards the odd-numbered U-component and V-component lines. In an alternative embodiment, the image encoding system 40 with the hybrid coding kernel encodes Y components on a dual-line-by-dual-line basis, encodes each of odd-numbered U-component and V-component lines and discards the even-numbered U-component and V-component lines.

Figure 8B:
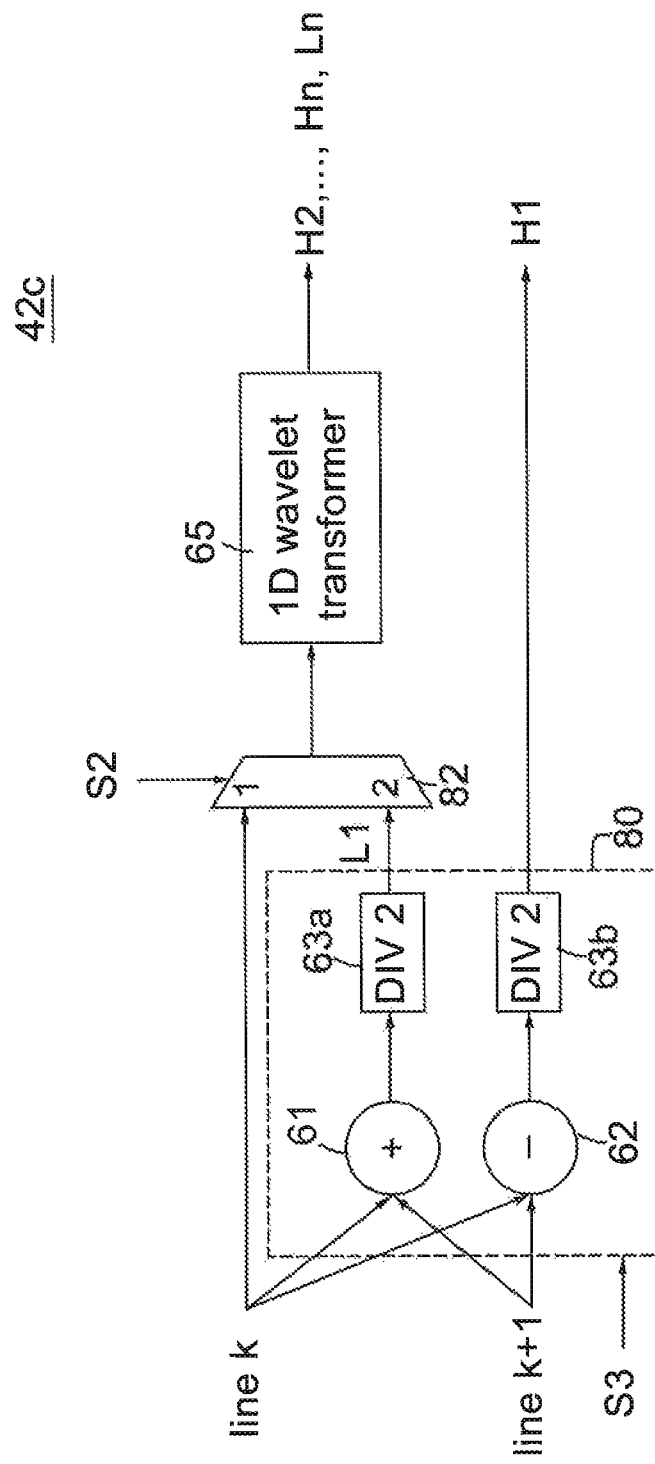
FIG. 8B is a schematic diagram of the wavelet transform unit 42c according to another embodiment of the invention.

FIG. 8B is a schematic diagram of the wavelet transform unit 42c according to another embodiment of the invention. Referring to FIG. 8B, the wavelet transform unit 42c in a hybrid configuration includes a transforming circuit 80, a multiplexer 82 and a 1D wavelet transformer 65. The transforming circuit 80 includes an adder 61, a subtractor 62 and two dividers 63a-63b. The wavelet transform unit 42c in a hybrid configuration performs n-level dual-line-based wavelet transform on two consecutive Y-component lines k & (k+1) and performs (n−1)-level 1D wavelet transform on every other U-component line k and every other V-component line k.

When the wavelet transform unit 42c is configured in dual-line mode, the transforming circuit 80 is enabled by an asserted control signal S3 and the multiplexer 82 directs a data flow from a second input port to the output port according to a control signal S2. When in dual-line mode, the transforming circuit 80 operates in conjunction with the 1D wavelet transformer 65. The operations of the wavelet transform unit 42c are the same as those of the wavelet transform unit 42a. When the wavelet transform unit 42c is configured in single-line mode, the transforming circuit 80 is disabled by a de-asserted control signal S3 and the multiplexer 82 directs a data flow from a first input port to the output port according to the control signal S2; thus, the 1D wavelet transformer 65 performs 1D wavelet transform on every other U-component line k and every other V-component line k.

Assuming that the wavelet transform unit 42c performs four-level dual-line-based wavelet transform on two consecutive 720-pixel Y-component lines k & (k+1) of a 720×480 color image and performs three-level 1D wavelet transform on one 720-pixel U-component line k and one 720-pixel V-component line k of the 720×480 color image. When in dual-line mode, after the four-level dual-line-based wavelet transform is complete, the wavelet transform unit 42c generates wavelet coefficients of five sub-band images (i.e., H1, H2, H3, H4 and L4 sub-band images) for the two consecutive 720-pixel Y-component lines. That is, the divider 63b generates a high-pass image H1 and the 1D wavelet transformer 65 generates four sub-band images H2, H3, H4 and L4. When in single-line mode, after the three-level 1D wavelet transform is complete, the 1D wavelet transformer 65 generates wavelet coefficients of four sub-band images (i.e., H1, H2, H3 and L3 sub-band images) for each of the 720-pixel U-component and the 720-pixel V-component line.

As is well known to those skilled in the art, each frequency sub-band has its own quantization value in the wavelet transformed image. The quantizer 43 receives the wavelet transformed image, performs quantization, and generates a quantized image. In the quantizer 43, the following linear equation is used to describe the quantization value Q[z] of each sub-band:

$$Q[z]=B+M*z,$$

where the parameter z ranges from 0 to (r−1), the parameter r denotes the number of sub-bands in a wavelet transformed image, and B and M are positive real numbers. In the above equation, the quantization values Q[z], from Q[0] to Q[r−1], respectively correspond to the sub-bands with different frequency levels, i.e., from the lowest frequency sub-band to the highest frequency sub-band. Take FIG. 7C for example. The corresponding quantization values of the five sub-bands are respectively shown in the lower part of FIG. 7C. Q[0] corresponds to the lowest frequency sub-band L3 while Q[4] corresponds to the highest frequency sub-band H1D.

In the quantizer 43, each wavelet coefficient in each sub-band of the wavelet transformed image is divided by a corresponding quantization value Q[z] and rounded to the nearest integer to obtain a quantized coefficient. Referring back to FIG. 4, the output buffer 46 generates an index signal S1 to the quantizer 43, where the index signal S1 indicates a buffer fullness relative to the capacity of the output buffer 46. In an embodiment, the buffer fullness is a fraction of the output buffer capacity. The quantization values Q[z] vary according to different levels of the buffer fullness. For example, if the buffer fullness reaches a first threshold T1, the quantization values Q[z] are increased; otherwise, if the buffer fullness is less than a second threshold T2, the quantization values Q[z] are decreased.

In one embodiment, the following program codes are provided to adaptively vary the quantization values Q[z] according to different levels of the buffer fullness:

```
Increase_Quantization = 0;
Descrease_Quantization = 0;
B=init1; /* B and M are positive real numbers */
M=init2;
if (Buffer_Fullness > T1) Increase_Quantizaiton = 1;
    Else if (Buffer_Fullness < T2) Decrease_Quantization = 1;
    /* when Buffer_Fullness > T1, increase B and M */
    /* when Buffer_Fullness < T2, decrease B and M */
If (Increase_quantization) {
    B += stepb; /* stepb and stepm are positive real numbers */
    M += stepm;
}
Else if (Decrease_quantization) {
    B −= stepb;
    M −= stepm;
}
for z=0: (r − 1)
    Q[z] = B + M * z;
end
```

The quantizer 43 of the invention has the following advantages: (1) the quantization value of each sub-band is obtained by real-time calculation so that no memory space is needed to save the quantization values; (2) the quantization values Q[z] vary according to different levels of the output buffer fullness so that a trade-off between the image quality and the buffer fullness is considered.

Figure 9:
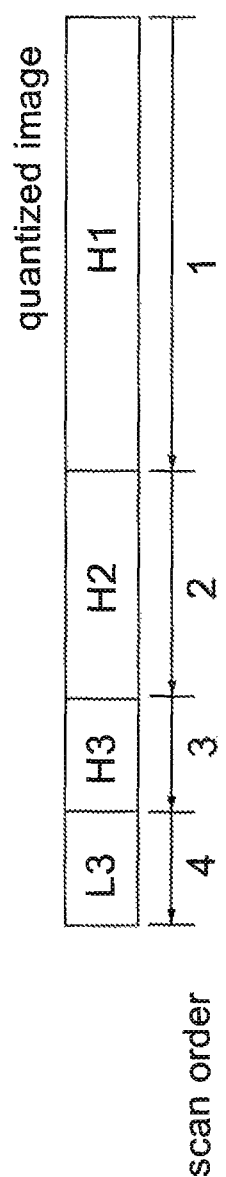
FIG. 9 shows an exemplary scan order of the scan unit according to the embodiments of FIGS. 4 and 60.

Referring back to FIG. 4, the quantizer 43 generates the quantized image and stores the quantized image into the SRAM buffer 49. FIG. 9 shows a scan order of the scan unit according to the embodiments of FIGS. 4 and 6C. Assuming that the quantizer 43 receives the wavelet transformed image of FIG. 6C and generates the quantized image of FIG. 9. Referring to FIG. 9, the scan unit 44 performs a line scanning on the quantized coefficients of the quantized image in reverse order (hereinafter called "reverse line scanning"). That is, starting from the right bound of the H1 sub-band image (i.e., from the last coefficient of the H1 sub-band image) in the quantized image, the scan unit 44 sequentially scans or reads the quantized coefficients of the four sub-bands and supplies the scanned coefficients to the entropy coder 45 until the left bound of the L3 sub-band image (i.e., the first coefficient of the L3 sub-band image) is reached. Since the way that the scan unit 44 performs the reverse line scanning is straightforward, its memory addressing is easy to control.

After that, the entropy coder 45 encodes the scanned coefficients from the scan unit 44 to produce a compressed image to be stored in the output buffer 46. Specifically, the entropy coder 45 performs entropy compression on the scanned coefficients using adaptive run length Golomb-Rice coding, Huffman coding, binary arithmetic coding or a combination thereof.

Figure 10:
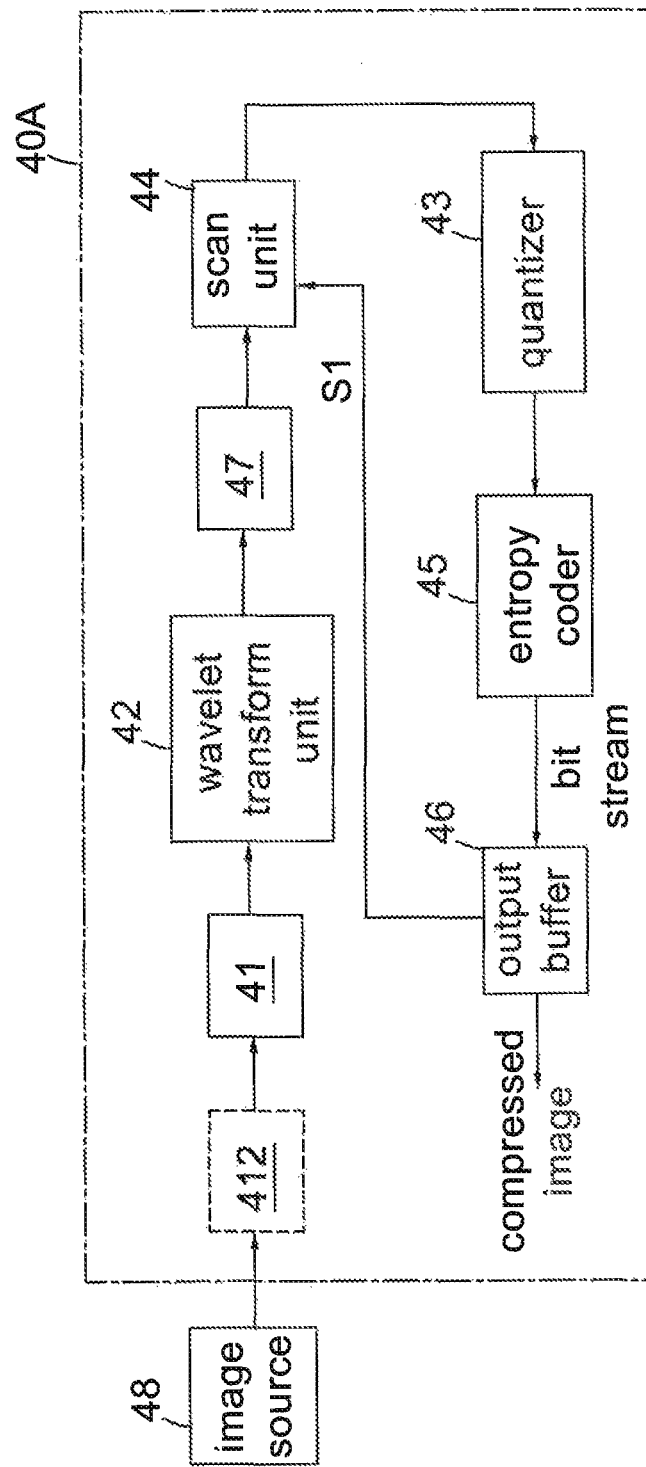
FIG. 10 is a block diagram showing an image encoding system according to another embodiment of this invention.

FIG. 10 is a block diagram showing an image encoding system according to another embodiment of this invention. Comparing FIGS. 4 and 10, the positions of the quantizer 43 and the scan unit 44 are swapped. On the other hand, since the scan unit 44 is a front end circuit of the quantizer 43 in FIG. 10, the SRAM buffer 49 is discarded.

As the image resolution increases, each component line may contain a large amount of components or samples, e.g., up to 4000 components. It imposes a huge burden on the wavelet transform unit 42. Accordingly, the dividing unit 412 needs to be included in the image encoding system 40. Referring back to FIGS. 4 and 10, the dividing unit 412 is provided to dividing each component line from the image source 48 into a plurality of component divisions depending on the number of components that the wavelet transform unit 42 can deal with each time. In a case that the wavelet transform unit 42 can process only 360 components each time, the dividing unit 412 has to divide each component line into two component divisions for a 720×480 color image and saves them into the SRAM buffer 41. Then, the component divisions stored in the SRAM buffer 41 are supplied to the wavelet transform unit 42 in a predetermined sequence according to the type of coding kernel. FIG. 11A shows an exemplary sequence of encoding a 720×480 color image based on the single-line coding kernel capable of processing 360 components. As clearly illustrated in FIG. 11A, the sequence is supplied to the wavelet transform unit 42 on a division-by-division and line-by-line basis. The key to form the sequence is to string together the corresponding divisions of the same pixel line. For example, the first halves of the same pixel line (e.g., Y[0], U[0] and V[0]) are firstly strung together and then followed by the second halves of the same pixel line.

In a similar manner, FIG. 11B shows an exemplary sequence of encoding a 720×480 color image based on the dual-line coding kernel capable of processing 360 components; FIG. 11C shows an exemplary sequence of encoding a 720×480 color image based on the hybrid coding kernel capable of processing 360 components. Please be noted that in the foregoing examples of FIGS. 11A-11C, the number of component divisions generated by the dividing unit 412 for each component line and the number of components (or samples) that the coding kernels (or the wavelet transform unit 42) can deal with are provided by example and not limitations of the invention. In the actual implementations, any number of component divisions (generated by the dividing unit 412 for each component line) and any number of components (that the coding kernels (or the wavelet transform) can deal with) can be used depending on different circuit designs and these also fall in the scope of the invention.

In sum, since the wavelet transform unit (42, 42a, 42b, 42c) of the invention performs a line-based wavelet transform (one of 1D wavelet transform, dual-line-based wavelet transform, four-line-based wavelet transform and hybrid wavelet transform), the amount of processing data is far less than that used in a conventional 2D wavelet transform unit. Accordingly, an image encoding system of the invention can use SRAM buffers (41, 46, 47, 49) instead of using a DRAM buffer to store the processing data, thus having a good compression quality and maintaining a substantially constant transmission rate. The image encoding system of the invention is well suited for real-time image transmission.

While certain exemplary embodiments have been described and shown in the accompanying drawings, it is to be understood that such embodiments are merely illustrative of and not restrictive on the broad invention, and that this invention should not be limited to the specific construction and arrangement shown and described, since various other modifications may occur to those ordinarily skilled in the art.

What is claimed is:

1. An image encoding system, comprising:
   a wavelet transform unit for performing a multiple-line-based wavelet transform on plural consecutive component segments to generate a wavelet transformed image comprising wavelet coefficients of plural sub-bands; and
   a processing circuit coupled to the wavelet transform unit for quantizing, scanning and encoding the wavelet coefficients to generate a compressed image;
   wherein a number of the plural consecutive component segments is a multiple of 2 and less than 5;
   wherein the number of the plural consecutive component segments equals 4; and, wherein the wavelet transform unit performs a n-level four-line-based wavelet transform on the plural consecutive component segments; and, wherein a number of the plural sub-bands is equal to (n+2), where n>=3.

2. The system according to claim 1, wherein the plural consecutive component segments are plural consecutive component lines of an image.

3. The system according to claim 1, wherein the wavelet transform unit performs addition operations, subtraction operations and 1D wavelet transform on the plural consecutive component segments to generate the wavelet transformed image.

4. The system according to claim 1, wherein the wavelet transform unit comprises:
   a first adder for adding a first component segment and a second component segment of the plural consecutive component segments to generate a first low-pass image;
   a first subtractor for subtracting the second component segment from the first component segment to generate wavelet coefficients of a first sub-band;
   a second adder for adding a third component segment and a fourth component segment of the plural consecutive component segments to generate a second low-pass image;
   a second subtractor for subtracting the fourth component segment from the third component segment to generate wavelet coefficients of a second sub-band;
   a third adder for adding the first low-pass image and the second low-pass image to generate a third low-pass image;
   a third subtractor for subtracting the second low-pass image from the first low-pass image to generate wavelet coefficients of a third sub-band; and
   a wavelet transformer for performing (n−2)-level 1D wavelet transform on the third low-pass image to generate wavelet coefficients of the other sub-bands;
   wherein the wavelet coefficients of the first sub-band, the second sub-band, the third sub-band and the other sub-bands form the wavelet transformed image.

5. The system according to claim 1, wherein the processing circuit comprises:
   a quantizer for performing comparison and calculation according to an upper threshold, a lower threshold and an index signal to generate quantization values of the plural sub-bands and performing quantization on the plural sub-bands according to the quantization values of the plural sub-bands;
   an entropy coder for encoding and generating the compressed image; and
   an output buffer for storing the compressed image and generating the index signal;
   wherein the index signal indicates a buffer fullness relative to a capacity of the output buffer;
   where the processing circuit is configured to read the plural sub-bands in reverse order;
   wherein the quantization values of the plural sub-bands are related to the plural sub-bands and the buffer fullness; and
   wherein the quantizer is coupled between the wavelet transform unit and the entropy coder.

6. The system according to claim 5, wherein the magnitudes of the quantization values of the plural sub-bands increase as the buffer fullness increases.

7. The system according to claim 5, wherein the magnitudes of the quantization values of the plural sub-bands increase as corresponding frequency levels of the plural sub-bands increase.

8. The system according to claim 5, wherein the output buffer is implemented with a static random-access memory (SRAM).

9. The system according to claim 1, wherein a number of the wavelet coefficients is equal to the sum of components in the plural consecutive component segments.

10. The system according to claim 1, further comprising:
    an input buffer coupled to the wavelet transform unit for storing a plurality of component divisions and outputting corresponding component divisions of plural consecutive component lines of the image as the plural consecutive component segments;
    where the processing circuit is configured to divide each component line of an image into the plurality of component divisions.

11. An encoding method applied in an image encoding system, comprising:
    performing a multiple-line-based wavelet transform on plural consecutive component segments to obtain a wavelet transformed image comprising wavelet coefficients of plural sub-bands; and
    quantizing, scanning and encoding the wavelet coefficients to obtain a compressed image;
    wherein a number of the plural consecutive component segments is a multiple of 2 and less than 5;
    wherein the step of performing comprises:
    performing a n-level four-line-based wavelet transform on the plural consecutive component segments to obtain the wavelet transformed image; and
    wherein the number of the plural consecutive component segments equals 4 and a number of the plural sub-bands is equal to (n+2), where n>=3.

12. The method according to claim 11, wherein the plural consecutive component segments are plural consecutive component lines of an image.

13. The method according to claim 11, wherein the step of performing the n-level four-line-based wavelet transform comprises:
    adding a first component segment and a second component segment of the plural consecutive component segments to obtain a first low-pass image;
    subtracting the second component segment from the first component segment to obtain wavelet coefficients of a first sub-band;
    adding a third component segment and a fourth component segment of the plural consecutive component segments to obtain a second low-pass image;
    subtracting the fourth component segment from the third component segment to obtain wavelet coefficients of a second sub-band;
    adding the first low-pass image and the second low-pass image to obtain a third low-pass image;
    subtracting the second low-pass image from the first low-pass image to obtain wavelet coefficients of a third sub-band; and
    performing (n−2)-level 1D wavelet transform on the third low-pass image to generate wavelet coefficients of the other sub-bands;
    wherein the wavelet coefficients of the first sub-band, the second sub-band, the third sub-band and the other sub-bands form the wavelet transformed image.

14. The method according to claim 11, wherein the step of quantizing, scanning and encoding comprises:
    performing quantization on the plural sub-bands according to quantization values of the plural sub-bands and an index signal;
    reading the plural sub-bands in reverse order;
    encoding and generating the compressed image; and
    storing the compressed image and generating the index signal by an output buffer;
    wherein the index signal indicates a buffer fullness relative to a capacity of the output buffer;
    wherein the quantization values of the plural sub-bands are related to the plural sub-bands and the buffer fullness; and
    wherein the image encoding system comprises the output buffer.

15. The method according to claim 14, wherein the magnitudes of the quantization values of the plural sub-bands increase as the buffer fullness increases.

16. The method according to claim 14, wherein the magnitudes of the quantization values of the plural sub-bands increase as corresponding frequency levels of the plural sub-bands increase.

17. The method according to claim 11, further comprising:
    dividing each component line of an image into a plurality of component divisions; and
    outputting corresponding component divisions of plural consecutive component lines of the image as the plural consecutive component segments.

* * * * *